May 28, 1957 E. A. DIETZ 2,793,864

PHONOGRAPH

Filed Nov. 12, 1952 3 Sheets-Sheet 1

INVENTOR
Edward A. Dietz
BY George H. Fritzinger
AGENT

May 28, 1957 E. A. DIETZ 2,793,864

PHONOGRAPH

Filed Nov. 12, 1952 3 Sheets-Sheet 2

INVENTOR
Edward A. Dietz
BY AGENT
George H. Fritzinger

PHONOGRAPH

Filed Nov. 12, 1952 3 Sheets-Sheet 3

INVENTOR
Edward A. Dietz
BY
AGENT
George H. Fritzinger 2,793,864

PHONOGRAPH

Edward A. Dietz, Westfield, N. J., assignor, by mesne assignments, to McGraw-Edison Company, Elgin, Ill., a corporation of Delaware Application November 12, 1952, Serial No. 320,025

13 Claims. (Cl. 274—13)

This invention relates to a phonographic machine of the type adapted for recording and/or reproducing dictation.

The invention relates especially to a novel mechanism adapted for controlling the engagement of the recording and/or reproducing devices (hereinafter sometimes referred to as translating devices) with the record.

General objects of the invention are to provide a new and improved control mechanism for the translating devices of dictating machines adapted to simplify the use of such machines, to render the machines more foolproof against misoperation, and especially to safeguard the translating devices and record from damage caused by inadvertent misoperation of the machine.

It is a further object to provide a translating-device controlling mechanism which is subject to a plurality of mutually independent manually-operable means in such manner that each of the manual means must be in a predetermined position to effect engagement of the recording and/or reproducing device with the record.

It is another object to provide a controlling mechanism for the translating devices, which is subject to manual means for controlling other components of the machine.

It is another object to provide a record-reproduce shift means for the translating devices, and independent control means for engaging and disengaging the translating devices with and from the record.

It is another object to provide an improved translating device control mechanism for dictating machines wherein engagement and disengagement of a translating device with and from a record is effected incidental to securing and releasing the record to and from the record support, and wherein is provided a record-reproduce shift control operable only to engage and disengage the recorder with and from the record while the record is secured to the record support.

Another object is to provide an improved and simplified safety mechanism which permits movement of the translating devices into position for engagement with a mounted record only when a record is on the support.

Further detailed objects are to provide such safety mechanism operable into ineffective position by the record itself as the record is mounted on the record support; to provide such safety mechanism with simple means to cause it to be moved out of contact with the record as the translating device is moved into engagement with the record; and to provide such safety means with novel biasing means to detent it releasably in effective position when the record support is free of a mounted record and in ineffective position free of a mounted record when the translating device is engaged with the record.

These and other objects and features of my invention will be apparent from the following description and the appended claims.

In the description of my invention reference is had to the accompanying drawings, of which:

Figure 1 is a fractional plan view of operating mechanism of a dictating machine incorporating my invention;

Figures 2 and 3 are sectional views taken respectively on the lines 2—2 and 3—3 of Figure 1;

Figure 1:
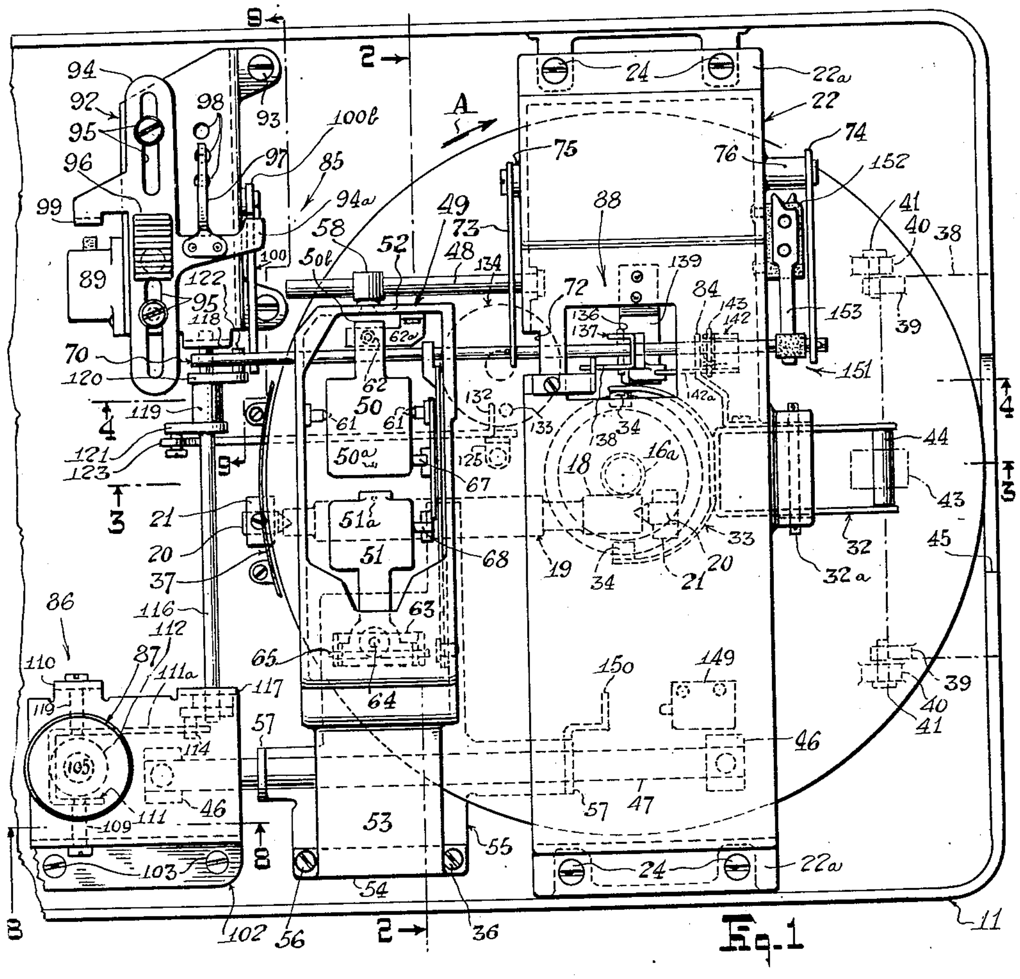
Figure 8:
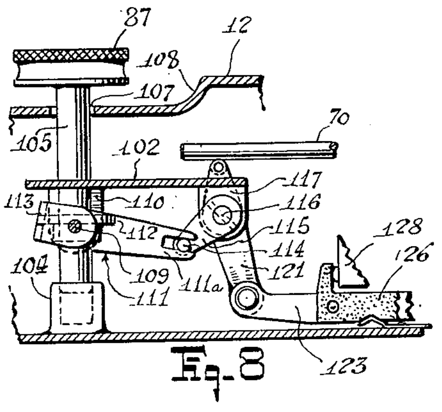
Figure 9:
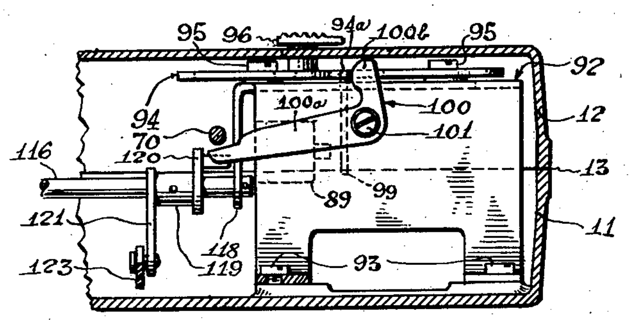
Figure 10:
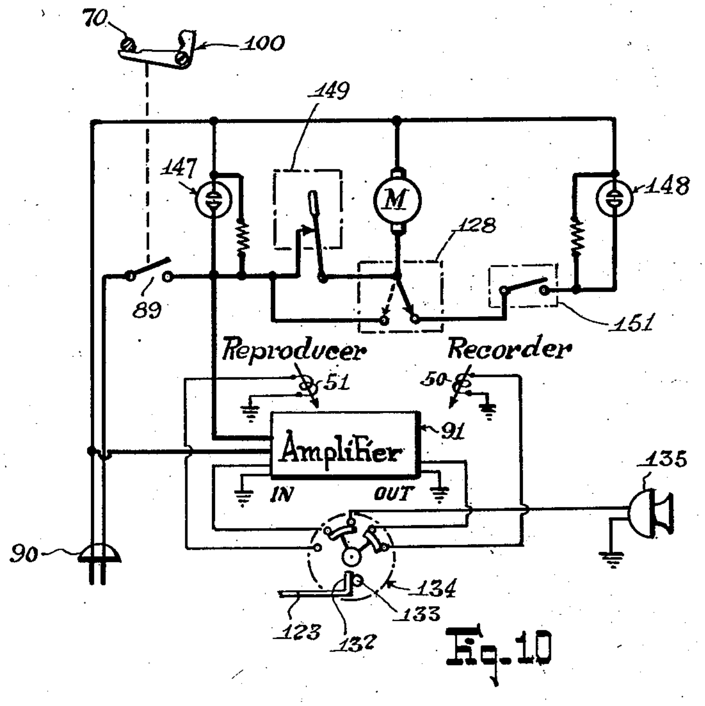

Figures 8 and 9 are fractional sectional views taken substantially on the lines 8—8 and 9—9 of Figure 1; and Figure 10 is a diagrammatic view of circuits and mechanism showing the electrical circuit system preferably employed in the present machine.

Figure 2:
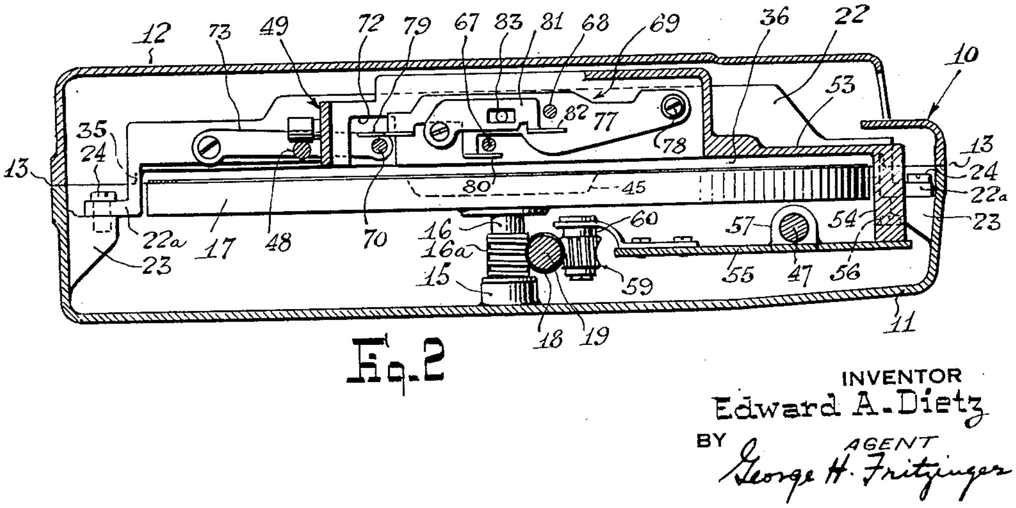
Figure 3:
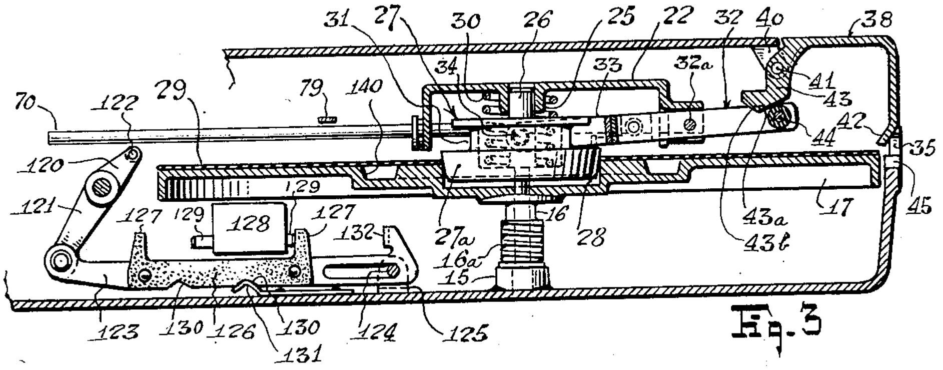

The present dictating machine may by way of preferred example have a housing 10 comprising relatively flat lower and upper pan-like members 11 and 12 rectangular as viewed from the top, which meet on a horizontal plane at the line 13—13 of Figure 2 to form a closed structure, the two housing members being secured together by suitable means not herein necessary to show. The lower housing member, which serves also as a frame structure for the machine, has an upstanding post 15 (Figure 3) centrally apertured to form a bearing for a vertical shaft 16 of a turntable 17. The shaft 16 has an enlarged diameter portion 16a which rests rotatably on the upper face of the post to support the turntable vertically. This enlarged diameter portion is spirally grooved to form a worm gear which meshes with a similarly grooved worm wheel portion 18 of a transverse lead screw 19. This lead screw is supported rotatably at its ends by cone pivots 20 on brackets 21 upstanding from the lower housing member. The turntable is rotated in direction of arrow A by a motor M, diagrammatically shown in Figure 10, and the lead screw is turned through its worm-gear coupling with the turntable.

Overlying a central portion of the turntable is a front-to-back extending bridge 22 having footlike portions 22a at its ends mounted on integral bracket extensions 23 of the lower housing member and held thereto by screws 24. On this bridge axially in line with the turntable is an interior bearing 25 slidably receiving a rod 26 (Figure 3) for vertical reciprocative movement. Staked to the inner end of this rod is a hollow circular record centering and/or clamping member 27 (hereinafter referred to simply as a securing member), the lower portion 27a of which is tapered and adapted to fit into a central well 28 of the turntable to center and hold thereon a thin record disc 29 having a central opening just slightly smaller in diameter than that of the central well. A compression spring 30 is interposed between the bridge 22 and the securing member 27 in surrounding relation to the rod 26 and bearing 25 to urge the securing member downwardly into record-centering position. The upper portion of the securing member surrounds the compression spring 30 and is provided with a wide peripheral groove 31. A lever 32 is pivoted at 32a to the right side of the bridge 22 and is provided with a fork 33 at its inner end in embracing relation with the upper grooved portion of the securing member. Secured to this fork are diametrically-opposite and inwardly-extending pins 34 which engage the groove 31 to couple the lever 32 to the securing member. On rocking the lever 32 clockwise (Figure 3), the securing member is disengaged from the turntable and record and, on release of the lever, the securing member is engaged with the record and turntable by the spring 30.

The record disc is slid onto the turntable through a narrow slot 35 in the right side of the housing. This slot is slightly longer than the diameter of the record, and is at a level extending upwardly from the top face of the turntable. The horizontal portion of the bridge 22 and the turntable form the top and bottom walls of a record guideway 36 inside the housing, and the depending foot portions 22*a* of the bridge form the side walls of this guideway. At the inner side of the turntable opposite the slot 35 thre is a bracket 37 on the lower housing member forming a record stop. As a record is inserted into the slot the same is guided into an approximately centralized position on the turntable, and upon next releasing the record-securing lever 32 the cone-shaped securing member enters the central opening of the record to finally center it and thereupon hold the same to the turntable.

To facilitate removal of the record disc, a rectangular section 38 of the upper housing member, which leads from the slot 35, is pivoted along its inner edge for upward tilting movement into open position. As indicated by dash-dot lines in Figure 1, this openable cover section is approximately half as long as the diameter of the turntable. The pivoting means for this cover section comprises depending standards 39 on the upper housing member, respectively adjacent standards 40 on the cover section, and respective cross pins 41 pivotally interconnecting the standards. The cover section is weight-biased into closed position shown in Figure 3. When it is in this closed position, an inwardly-curved lip 42 of the cover section blocks the slot 35 to prevent insertion of a record disc. This is provided to force opening of the cover section preliminary to removal of a record disc from the turntable.

At the inner portion of the cover section 38 there is a depending arm 43 having a cam face 43*a* and dwell 43*b*. As the cover section is opened, the arm 43 swings downwardly against a roller 44 pivoted to the record-securing lever 32, to cause this lever to be cammed clockwise (Figure 3) wherefore to disengage the record-securing member from the record disc. In the latter portion of the opening movement of the cover section, the dwell 43*b* comes onto the roller to lock the lever 32 in its operated position and to retain the cover in open position. The central portion of the bottom edge of the slot 35 is recessed at 45 (Figures 1 and 3) so that when the cover section 38 is open the user will have access to pick up the outermost portion of the disc record from the turntable with an inward and upward sweep of the hand. After inserting a record disc on the turntable, the cover section 38 is returned to closed position. As this is done the record-securing member is released to center the record on the turntable as before explained.

On the lower housing member in the front portion thereof, there are two transversely-spaced standards 46 supporting a cross rod 47. Staked to the left wall of the bridge 22 is a second cross rod 48 which is in the rearward portion of the housing and parallel to the rod 47. These cross rods 47 and 48 carry slidably a carriage 49 for recording and reproducing devices 50 and 51. The frame of the carriage may be a casting comprising a hollow rectangular portion 52 totally open at the bottom and partially open at the top (Figure 1) and an integral forward extension 53 having a footlike portion 54 depending from the forward end thereof. A horizontal plate 55 is secured by screws 56 to the bottom face of the portion 54 and extends inwardly below the carriage. This plate has two apertured lugs 57 struck upwardly therefrom which slidably embrace the cross rod 47 to support the carriage at its forward end. A pin 58 is riveted to the rear wall of the rectangular carriage portion 52 and rests slidably on the cross rod 48 to support the carriage at its rearward end. As so mounted the carriage overlies the inner left half portion of the turntable for radial movement thereacross.

The carriage is driven by the lead screw 19 as by way of a circular feed nut 59 rotatably mounted on the carriage plate 55 in meshing relation with the lead screw and frictionally held sufficiently against rotation as by a friction connection 60 interposed between it and the carriage plate to cause the carriage to be driven as the lead screw is turned. However, the frictional means 60 is adapted to yield to force exerted on the carriage so that the carriage can be moved manually to any desired position in its range of travel.

The recorder 50 is carried on cone pivots 61 mounted on the opposite walls of the carriage, and has a stylus 50*a* at its forward end for engaging a mounted record. Biasing force to engage the stylus with the record is provided partially by the weight thereof and partially by a compression spring 62 interposed between a rearward tab 50*b* on the recorder and a bracket 62*a* on the carriage.

The reproducer 51 is mounted in front of the recorder for universal (lateral and vertical) movement relative to the carriage. A universal mounting for the reproducer comprises a gimbal ring 63 pivoted to the frame on a vertical pin 64 and a cross pin 65 on the gimbal ring to which a tailpiece of the reproducer is pivoted. The reproducer has a stylus 51*a* at its rearward end for engaging the record as in response to a weight biasing of the reproducer. In its normally laterally-centralized position, the reproducer stylus engages the record at a short distance behind the recorder as with respect to the direction of travel of the carriage.

The recorder and reproducer have lateral pins 67 and 68 at their free end portions by which they may be lifted from the turntable as during record replacement. The lifting is done through a lever mechanism 69 mounted on the right wall of the carriage and operated by a lift rod 70 extending parallel to the path of movement of the carriage through slots 72 in the carriage 49 and bridge 22 (Figure 2). The right half portion of the rod is secured to arms 73 and 74 forming a bail, which are pivoted to opposite sides of the bridge 22, as to respective outwardly-extending bosses 75 and 76, to permit the rod 70 to be moved up and down with horizontal parallel movement.

The lever mechanism 69 comprises a front-to-back extending lever 77 pivoted at 78 to the right wall of the carriage and having a tailpiece 79 resting slidably on the lift rod 70. This lever has an intermediate tab 80 underlying the pin 67 for lifting the recorder as the lift rod 70 is raised. The mechanism 69 further includes a relatively short back-to-front extending lever 81 which has a tab 82 underlying the pin 68 of the reproducer. The lever 81 is coupled to the lever 77 through a pin and slot connection 83 at the intermediate portions thereof. Since this pin and slot connection is approximately vertically in line with the tab 80 for lifting the recorder, the tab 82 for lifting the reproducer is raised with amplified movement relative to that of the recorder; however, the tab 82 has a lowermost position at a considerable distance below the pin 68 so that the recorder may be raised from the record without raising the reproducer. This raising of only the recorder is accomplished as the lift rod 70 is raised from its lowermost to an intermediate position. As the lift rod is raised further to its uppermost position the reproducer is raised also and with amplified movement to a height about equal to that of the recorder. Thus, both units are lowered onto and lifted from the record as the lift rod is moved between fully-raised and fully-lowered positions and only the recorder is lowered onto and lifted from the record as the lift rod is moved between intermediate and lowered positions. In view of the functioning of the lift rod 70 here explained, its uppermost, intermediate and lowermost positions are herein termed its neutral, reproducing, and recording positions respectively.

In the present machine the lift rod is in recording position to place both the recorder and reproducer in engagement with the record during normal recording operation, but the circuits are completed only as to the recorder as is hereinafter described. To reproduce, the lift rod is raised to its intermediate or reproduce position to lift the recorder from the record and to complete the circuits with respect to the reproducer. To put the machine in inoperative conditions, the lift rod is raised to neutral position to disengage both recorder and reproducer from the record.

Several different control means of the machine are herein utilized to control positioning of the lift rod in connection with the control of other components of the machine. Each of these control means has only a one-way coupling with the lift rod effective to raise or retain the rod in reproducing and neutral positions but ineffective to force lowering of the rod. Only when each of these control means is positioned to permit lowering of the lift rod will the latter move to lowered position and then it does so by its own weight and the downward biasing thereof from the recorder and reproducer transmitted through the lever mechanism 69. Firstly, the lift rod has a one-way coupling with the record-securing mechanism effective to raise the lift rod to neutral position as the record-securing mechanism is released and to permit, but not force, the lift rod to be lowered as the record-securing mechanism is actuated. This is accomplished through a side arm 84 on the inner portion of the record-securing lever 32, the end portion of which underlies the lift rod to raise the same as the record-securing mechanism is released. Secondly, the lift rod is coupled to an on-off master switch operating means generally referred to as 85, which enables the rod to be retained in neutral position while the master switch is in "Off" position. Thirdly, upon release of the lift rod from neutral position by the record-securing mechanism and master switch operating means, the lift rod can be shifted between record and reproduce positions by a record-reproduce control mechanism 86 operable by a control knob 87. Fourthly, and lastly, a new and improved safety mechanism 88 is provided to withhold lowering of the lift rod from a neutral position except when a record is mounted on the turntable. The second of these mechanisms for controlling the lift rod by the master switch control means is herein next described.

An on-off master switch 89 is provided for controlling electric power from a plug 90 to an amplifier 91, motor M and signaling devices hereinafter described, as shown in Figure 10. This master switch may be of the pushbutton type biased into "Off" or open position and movable to closed position as the pushbutton thereof is pressed inwardly. The switch is mounted on one side of an upstanding bracket 92 secured at 93 to the rearward central portion of the lower housing member (Figure 1). This bracket has a flat table-like top portion on which a manual slide 94 is mounted by screw and slot means 95 for front and back movement, the central portion of the slide having a raised corrugated fingerpiece 96 to facilitate manual movement thereof. A spring finger 97 on the slide is engageable successively with three holes 98 in the bracket to detent the slide in three different positions thereof. In the forward detented portion of the slide, a side lug 99 thereof bears against the pushbutton of the master switch to hold the switch closed. In the next or intermediate position of the slide the lug 99 is disengaged from the pushbutton and the master switch therefore assumes its open or "Off" position. In the rearward position of the slide the master switch remains in "Off" position. The last is a lock-up position for preventing lowering of the translating units onto the record. The operation is such that as the slide is moved into its lockup position, the lift rod 70 is either raised into neutral position or retained in that position if it is already there. This operation is accomplished through the medium of an L-shaped lift lever 100 pivoted at 101 to the right side of the bracket 92 and having one arm **100*a* extending forwardly below the lift rod 70 and a second arm 100*b* extending upwardly above the bracket 92. As the slide 94 is moved into lock-up position, a rightwardly-extending finger 94*a* thereof abuts against the arm 100*b* and moves the lever 100 clockwise (Figure 9) to cause the arm 100*a* thereof to assure that the lift rod 70 is in its neutral position. As the slide 94 is moved from lock-up to intermediate position, the finger 94*a* becomes disengaged from the arm 100*b* to permit the lift rod 70** to return to lowermost position shown in Figure 9.

The record-reproduce control mechanism 86 comprises a bracket 102 secured at 103 to the front portion of the lower housing member. Below this bracket 102 is an apertured boss 104 on the lower housing member forming a bearing for a vertically-movable shaft 105. This shaft projects upwardly through a bearing hole in the bracket 102 and through a clearance hole 107 in the upper housing member 12, and terminates in the control knob 87 hereinbefore mentioned. The upper housing member has a circular recess or well 108 surrounding the knob 87 in which the knob is disposed when in its downward or record position. The well is substantially larger in diameter than the knob to provide easy access to the latter by the fingers of the hand so that the knob can be raised to reproduce position shown in Figure 8. Aligned horizontal pivots 109 respectively in the front wall and in a depending lug 110 of the bracket 102 pivotally support a bail 111 which embraces the shaft 105. Secured to the shaft within this bail is a disk 112 having a peripheral portion engaging a slot 113 in the cross member of the bail to cause the bail to be rocked clockwise as the knob 87 is raised, and vice versa, as shown in Figure 8. The bail has a rightwardly-extending arm **111*a* terminating in a forked portion which embraces a pin 114 on a rocker arm 115. This arm is secured to a front-to-back extending shaft 116 which is pivoted at its front end in a depending apertured lug 117 of the bracket 102 and which is pivoted at its rearward end in a depending apertured lug 118 of the switch bracket 92 (Figure 1). This coupling of the bail 111 to the shaft 116 is such as to cause the latter to be turned counterclockwise as the knob 87** is raised, and vice versa.

On the rearward portion of the shaft 116 there is secured a hub 119 to the opposite ends of which are staked respective lever arms 120 and 121. The arm 120 carries a cross pin 122 which underlies the lift rod 70. When the control knob 87 is in record position this pin 122 is in a lowered position permitting the lift rod to assume its record position, but as the knob 87 is raised to reproduce position the pin 122 is moved to its uppermost position shown in Figure 8, which is a position permitting lowering of the lift rod 70 only to reproduce position. As hereinafter described, this reproduce position of the lift rod is one withholding the recorder from the record but permitting the reproducer to engage the record.

The arm 121 is pivoted to a link 123 extending transversely of the machine, the right end portion of which has a pin and slot connection 124 to a small bracket 125 on the lower housing member. The intermediate portion of this link carries an insulator plate 126 having upstanding ears 127 at its ends. Mounted on the lower housing member between these ears is a single-pole double-throw switch 128 having oppositely-extending pushbuttons 129 for operating the switch into its different positions. When the control knob 87 is in record position the rightward pushbutton is depressed (Figure 3) to cause the switch to occupy the position shown in Figure 10. As the control knob is raised to condition the machine for reproducing, the link is moved rightwardly to cause the leftward button 129 to be depressed to place the switch 128 in the dash-dot position shown in Figure 10. The bottom edge of the insulator plate has two notches 130 which are respectively engaged by a detent spring 131 to define the record and reproduce positions of the record-reproduce mechanism 86.

On the right end of the link 123 there is a transverse lug 132 operable against an upstanding pin 133 of a shielded amplifier reversing switch 134 of the character described in Dann Patent No. 2,280,143. The switch 134 is biased in record position wherein it connects a transducer, for example, receiver-microphone 135 (Figure 10) to the input of the amplifier 91 and connects the output of the amplifier 91 to the recorder 50. As the link 123 is moved rightwardly in response to raising the control knob 87 to reproduce position, the lug 132 presses the pin 133 rightwardly to connect the reproducer 51 to the input of the amplifier and to connect the output of the amplifier to the receiver-microphone 135. (For simplification, these several units are shown in Figure 10 as being grounded so that switching thereof is accomplished by single wires leading therefrom.) Thus, the audio circuit of the recorder is completed when the control knob 87 is depressed into record position, and the audio circuit of the reproducer is completed when the control knob is raised to reproduce position. However, the engagement of the recorder and reproducer with the record when the control knob is in record position and of only the reproducer with the record when the control knob is in reproduce position depends on whether the master switch is out of lock-up position and whether the record securing means is actuated and a record disc is on the turntable. The means for controlling the lift rod according to whether a record disc is on the turntable is herein next described.

Figure 4:
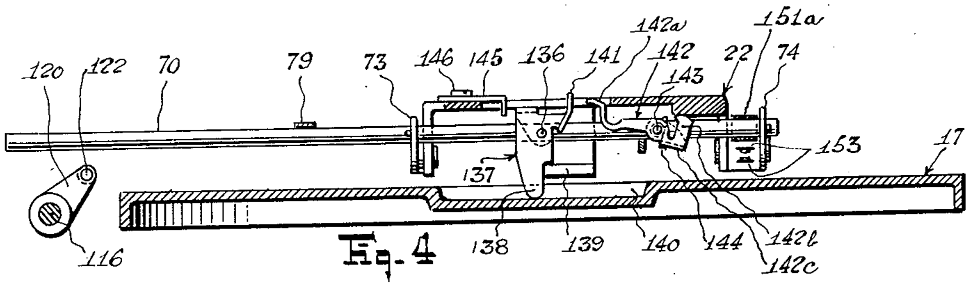
Figure 4 is a sectional view taken substantially on the line 4—4 of Figure 1 showing a safety mechanism in effective position to prevent movement of the translating devices into record-engaging positions except when a record is on the record support.

Pivoted at 136 to the portion of the lift rod 70 below the bridge 22, and at a point just rearward of the central opening of a mounted record, is a detent 137 in the form of a bail having a depending finger 138 biased by its weight into a vertical position shown in Figure 4. For releasably retaining the detent more definitely in vertical or locking position it may be made of magnetic material and may abut against a permanent magnet 139 bracketed to the bridge 22. In this downward position of the detent the finger 138 extends into a circular groove 140 (Figure 3) in the turntable concentric with the axis thereof, and terminates just short of the bottom wall of this groove. If the lift rod is released from downward position while the detent is in this vertical position the latter will abut against the bottom wall of the groove to lock the lift rod against movement out of neutral position.

Figures 5, 6, 7:
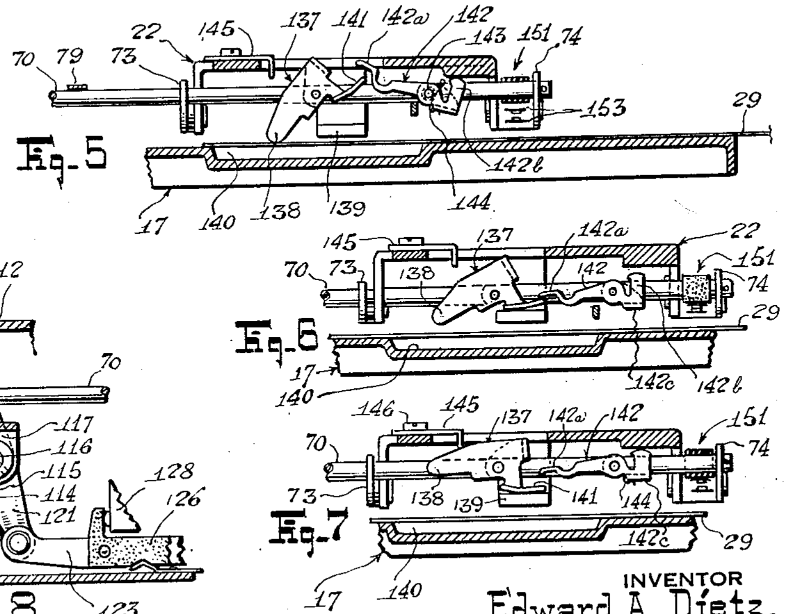
Figure 5 is a fractional view of the safety mechanism appearing in Figure 4, showing this mechanism in the intermediate ineffective position which it assumes when a record is mounted on the machine.
Figure 6 is a view similar to Figure 5 showing the safety mechanism in the fully ineffective position which it assumes when a record is mounted on the record support and both the recorder and reproducer are engaged with the record.
Figure 7 is a view similar to Figure 6 showing the safety mechanism in the fully ineffective position which it assumes when a record is on the record support and only the reproducer is engaged with the record.

When a record disc is inserted through the guideway 36 onto the turntable the same abuts against the detent 137 and cams it clockwise into an oblique position with respect to the record (Figure 5). This oblique position is beyond the critical angle for locking the lift rod and permits the lift rod to be lowered when the same is next released from neutral position, the detent sliding readily on the record and being cammed further clockwise as the lift rod is so lowered. As the detent 137 is lowered with the lowering of the lift rod and cammed clockwise by the record a lug 141 thereof moves into proximity with the magnet 139 to cause the detent to be attracted thereby in a further clockwise direction wherefore to disengage the finger 138 from the record. As either an additive or alternative means for so disengaging the finger 138 from the record, a lever 142 is pivoted at 143 also to the lift rod 70 and is biased counterclockwise (Figures 4 to 7) by a torsion spring 144. This lever has an arm **142*a* for striking against the lug 141 under pressure of the torsion spring to effect disengagement of the detent from the record. When the lift rod 70 is in neutral position shown in Figure 4, the lever arm 142*a* is in a raised ineffective position by reason of an arm 142*b* of the lever being then in abutment with the underside of the bridge 22. As the lift rod 70 is lowered—which is permissible only when a record is on the turntable to place the detent 137 in its oblique ineffective position—the lever 142 will be lowered and swung counterclockwise to cause the arm 142*a* to strike the lug 141 and swing the detent further clockwise wherefore to disengage it from the record. The actuated position of the lever 142 is defined by abutment of a stop lug 142*c* against the underside of the lift rod 70 as shown in Figure 6. When the lift rod is in its lowermost or record position, the relative positioning of the detent 137 and striking lever 142 may be approximate as shown in Figure 6. With the magnet 139 present the lug 141 may be in engagement therewith to hold the detent in a further actuated position. As the lift rod is raised from record position to reproduce position, the finger 138 of the detent comes into abutment with a stop lug 145 secured at 146 to the bridge 22 as shown in Figure 7. As the lift rod is raised from reproducing to neutral position the stop lug forces breaking of contact of the lug 141 of the detent from the permanent magnet 139, wherefore the detent will return counterclockwise to its oblique position to the record shown in Figure 5. As the detent is so returned with the lifting of the rod 70 to neutral position, the striking lever 142 is raised ahead of the lug 141 of the detent. In the sense that different portions of the detent 137 are moved into proximity with the magnet 139** to attract and releasably hold the detent in its effective and ineffective positions as the lift rod is raised and lowered, the magnet and the stated portions of the detent may be termed an over-center biasing means.

Since the safeguarding function of the detent 137 is to prevent lowering of the translating devices except when a record is on the turntable, the styli of these devices are safeguarded against being chipped and broken by being inadvertently impinged against and slid across the turntable. Also, since the translating devices are raised by release of the record-securing mechanism, the user is prevented from damaging the styli and possibly scratching the record by inadvertent attempts to mount and remove a record on and from the turntable while the translating devices are in lowered record-engageable positions.

The schematic circuit diagram of Figure 10 shows a signaling means differentiated as between recording and reproducing conditions of the machine, such as is disclosed and claimed in the pending application of Richard M. Somers, Serial No. 301,437, filed July 29, 1952, and entitled "Signaling Systems for Dictating Machines," now Patent No. 2,770,680, dated November 13, 1956. Herein are two signal lamps 147 and 148. The signal lamp 147 is connected to the power supply solely through the master switch 89. Thus when the master switch is closed the lamp 147 is lit. This normally signifies that the motor M is running since the motor is then also connected to the power supply except in the event that the carriage 49 is at the very end of its travel, in which case a normally-closed switch 149 serially in the motor circuit is held open by pressure of a lug 150 on the carriage against the pushbutton of the switch (Figure 1). The second signal lamp 148 is connected to the power supply through the master switch 89, end switch 149, record-reproduce switch 128 when in record position, and a switch 151. The switch 151 is mounted on an insulating stack 152 secured to the right side of the bridge 22 and comprises two forwardly-extending blades 153 normally open but so positioned that if the lift rod is lowered into its record position an insulating collar **151*a* thereon abuts against the upper blade and closes the switch. Since the switch 128 is then also in the full-line position shown in Figure 10, the lamp 148 is now also lit. Thus, lighting of both lamps 147 and 148 at the same time signifies that the machine is fully conditioned for recording. Removal of the light 148 while the light 147 remains lit is a positive indication only that the machine is not conditioned for recording since any one of several things, to wit, the carriage being at the end of its travel, the record-reproduce control knob 87 being in reproduce position to place switch 128 in its dash-dot position and/or the lift rod 70 being retained in raised position as by reason of the record-securing mechanism being not actuated or actuated without a record on the turntable, will cause the lamp 148** to be not lit.

In the foregoing description it will be understood that the separate means for controlling the positioning of the lift rod 70, which is associated respectively with the record-securing mechanism, the master switch operating means and the record-reproduce shift means, is each a withholding means with respect to the lift rod to prevent the lift rod from moving downwardly by its own weight and biasing into intermediate-reproduce and/or lowermost-record positions. Accordingly, the term "withholding means" used in the claims is meant to apply to any of these several means for preventing the lift rod from moving out of neutral position as well as the translating devices from moving into engagement with the record.

The embodiment of my invention hereinabove described is illustrative and not necessarily limitative of my invention since the same is subject to many changes and modifications without departure from the scope of my invention, which I endeavor to express according to the following claims.

I claim:

1. In a phonograph: the combination of a record support; a carriage mounted for traveling movement relative to said support; recording and reproducing translating devices movably mounted on said carriage and each urged towards said support for operative engagement with a record mounted thereon; a movably-mounted control member extending along the path of said carriage and movable between released and operated positions; a mechanism on said carriage for said recording and reproducing devices slidably coupled to said control member and including means effective when said control member is in fully-operated position to hold both said devices from the mounted record, when said control member is in an intermediate position to engage only said reproducing device with the record and when said control member is in released position to engage both of said devices with the mounted record; a first manually-operable means having a one-way coupling with said control member and effective only to shift said control member from released to intermediate positions; and a second manually-operable means independent of said first-stated manually-operable means, having a one-way coupling with said control member, for moving the latter into fully-operated position.

2. The combination set forth in claim 1 including actuatable means for securing a record to said support, and means coupling said second manually-operable means to said record-securing means to cause said control member to be moved to fully-operated position as said record-securing means is moved to unactuated position.

3. The combination set forth in claim 1 including a detent means coupled to said control member and cooperable with said record support only when said support is free of a mounted record for locking said control member into fully-operated position.

4. The combination set forth in claim 1 including actuatable means for securing a record to said support; detent means coupled to said control member and cooperable with said record support only when the support is free of a mounted record for retaining said control member in fully-operated position after actuation of said record-securing means; and means to guide a record into mounted position on said support and against said detent means to cause the latter to be moved to ineffective position as a record is mounted.

5. In a phonograph: the combination of a record support; a carriage mounted for traveling movement relative to said support; recording and reproducing translating devices movably mounted on said carriage and each urged towards said support for simultaneous operative engagement with a record mounted thereon; means actuatable to secure a record to said support; a first control means including respective lift members for said recording and reproducing devices, a common actuating member connected to both of said lift members and means coupled to said record-securing means for controlling said common actuating member to cause both of said devices to be shifted into and out of engagement with a record as the record is secured to and released from said support; and a second control means rendered operative by said securing means as the same is actuated for shifting only said recording device into and out of engagement with a mounted record.

6. In a phonograph: the combination of a record support; a movable translating device urged towards said support for operative engagement with a mounted record; manually-controllable movably-mounted means for withholding said translating device from the record; a detent member coupled to said withholding means and extending into the path of movement of a record onto said support for abutment against said support when the support is free of a mounted record whereby to block movement of said withholding means from effective position; means providing said detent member with freedom of movement transversely of said support and in the direction of movement of a record onto said support into an ineffective position wherein it is inoperative to block movement of said withholding means from effective position, said detent member being biased transversely of said support into effective position; and guide means confining mounting movement of a record to said path in directions of movement of said detent member for causing said detent member to be moved to ineffective position by a record as the same is mounted on said support.

7. The combination set forth in claim 6 wherein said detent means comprises relatively movable magnetic and cooperable magnetic means rendered effective as said detent member is moved to ineffective position for moving said detent member onwardly out of contact with the record being mounted.

8. The combination set forth in claim 6 including means responsive to movement of said withholding means to ineffective position for disengaging said detent member from the mounted record.

9. In a phonograph: the combination of a record support having a circular recess therein covered by a record when the latter is mounted thereon; a movable translating device urged towards said support for operative engagement with a mounted record; movably-mounted manually-controllable means for withholding said translating device from the record; and detent means comprising a movable detent member urged into said recess into an effective position for abutment against the inner wall of said recess to block movement of said translating device towards said support while said support is free of a mounted record, said detent member being urged in opposition to the direction of movement of a record onto said support and being engageable by a record and movable thereby to ineffective position as the record is mounted on said support.

10. In a phonograph: the combination of a record support having a central recess therein covered by a record when the latter is mounted thereon; a movable translating device urged towards said support for operative engagement with a mounted record; movably-mounted manually-controllable means for withholding said translating device from the record; a detent member operatively coupled to said translating device and mounted for oblique movement into and out of said recess along the path of mounting of a record onto said support, said detent member being lightly biased into said recess in effective position for abutment against the inner wall of said recess to block movement of said translating device towards said support while said support is free of a mounted record; and means to guide a record onto said support against said detent member and in opposition to the direction of bias thereof for causing the detent member to be moved out of said recess into ineffective position in oblique relation to a record as the record is mounted.

11. In a phonograph: the combination of a record support; a movable translating device urged towards said support for operative engagement with a mounted record; means including a movable lift member effective when the lift member is in raised position for withholding said translating device from engaging said mounted record; manually-operable means for lifting said lift member into raised position; and a detent member pivoted to said lift member and urged lightly into normal position relative to said record support for abutment against said support while said support is free of a mounted record whereby to retain the lift member in raised position, said detent member being extended into the path of movement of a record onto said support and the pivoting of said detent member being so directed as to permit the detent member to be cammed by a record, as the record is mounted on said support via said path, into an oblique position with respect to the surface of the record rendering the detent member ineffective to retain the lift member in raised position.

12. In a phonograph: the combination of a record support; a movably mounted translating device urged towards said support for operative engagement with a mounted record; manually-controllable movably-mounted means for withholding said translating device from the record; means for detenting said withholding means in effective position comprising a detent member extending into the path of movement of a record onto said support; means mounting said detent member for movement into an ineffective position by a record in said path as the record is moved onto said support, said detent member being urged to return to effective position when a mounted record is removed from said support; and record guide means for confining record mounting movement to said path.

13. The combination set forth in claim 12 wherein said mounting means comprises a pivot for said detent member positioned beyond said record path, said detent member being cammed about said pivot by a record in its movement in said path onto said support, with a portion of the detent member sliding on a face of the record; and means operable upon the detent member being cammed onto the face of the record for removing the detent member from contact with the record.

References Cited in the file of this patent

UNITED STATES PATENTS

| | | |
|---|---|---|
| 2,270,832 | Dunning | Jan. 20, 1942 |
| 2,380,727 | Dann | July 31, 1945 |
| 2,463,513 | Brubaker | Mar. 8, 1949 |
| 2,518,232 | Giovannucci | Aug. 8, 1950 |
| 2,566,091 | Masterson | Aug. 28, 1951 |
| 2,639,333 | Howell | May 19, 1953 |
| 2,698,183 | Lang | Dec. 28, 1954 |